(12) United States Patent
Mohapatra et al.

(10) Patent No.: US 7,278,667 B2
(45) Date of Patent: Oct. 9, 2007

(54) BUMPER ASSEMBLY WITH ENERGY ABSORBER

(75) Inventors: Subhransu Mohapatra, Bangalore (IN); Alok Nanda, Bangalore (IN); Frank Mooijman, Halsteren (NL)

(73) Assignee: General Electric Company, Schenectady, NY (US)

( * ) Notice: Subject to any disclaimer, the term of this patent is extended or adjusted under 35 U.S.C. 154(b) by 117 days.

(21) Appl. No.: 11/135,565

(22) Filed: May 23, 2005

(65) Prior Publication Data

US 2006/0261611 A1 Nov. 23, 2006

(51) Int. Cl.
*B60R 19/26* (2006.01)

(52) U.S. Cl. ....................................................... 293/132
(58) Field of Classification Search ................ 293/107, 293/102, 132, 146; 296/187.04, 187.03, 296/187.09
See application file for complete search history.

(56) References Cited

U.S. PATENT DOCUMENTS

| | | | |
|---|---|---|---|
| 3,884,455 A | 5/1975 | Weller et al. | |
| 3,997,207 A | 12/1976 | Norlin | |
| 5,056,840 A | 10/1991 | Eipper et al. | |
| 5,219,197 A | 6/1993 | Rich et al. | |
| 5,269,574 A | 12/1993 | Bhutani et al. | |
| 5,425,561 A | 6/1995 | Morgan | |
| 5,984,389 A | 11/1999 | Nuber et al. | |
| 5,988,713 A | 11/1999 | Okamura et al. | |
| 6,179,355 B1 | 1/2001 | Chou et al. | |
| 6,247,745 B1 | 6/2001 | Carroll, III et al. | |
| 6,286,879 B1 | 9/2001 | Haque et al. | |
| 6,354,641 B1 | 3/2002 | Schroeder et al. | |
| 6,406,081 B1 | 6/2002 | Mahfet et al. | |
| 6,443,513 B1 | 9/2002 | Glance | |
| 6,511,109 B1 | 1/2003 | Schultz et al. | |
| 6,726,262 B2 * | 4/2004 | Marijnissen et al. | 293/121 |
| 7,163,242 B2 * | 1/2007 | Shuler et al. | 293/120 |
| 2003/0047952 A1 * | 3/2003 | Trappe | 293/120 |
| 2003/0080573 A1 * | 5/2003 | Marijnissen et al. | 293/132 |

* cited by examiner

*Primary Examiner*—H Gutman
(74) *Attorney, Agent, or Firm*—Armstrong Teasdale LLP

(57) ABSTRACT

A bumper system for an automobile vehicle includes, in an exemplary embodiment, a beam configured to attach to the vehicle, and an energy absorber coupled to the beam. The energy absorber is tunable for meeting predetermined criteria for both low speed and pedestrian impacts and includes a frame portion and a body including a plurality of tunable crush lobes extending from the frame portion. Each crush lobe is longitudinally spaced apart from an adjacent crush lobe, and at least one crush lobe includes a first transverse wall, a second transverse wall spaced apart from the first transverse wall, a third transverse wall spaced apart from the second transverse wall, and a front wall coupled to the first and second transverse walls. The first, second, and third transverse walls extend from the frame portion and the second transverse wall is located between the first and third transverse walls.

17 Claims, 4 Drawing Sheets

BUMPER ASSEMBLY WITH ENERGY ABSORBER

BACKGROUND OF THE INVENTION

This invention relates generally to automobile vehicle bumpers, and more particularly, to energy absorbing vehicle bumper systems.

A known standard which bumper systems often are designed to meet is the United States Federal Motor Vehicle Safety Standard (FMVSS). For example, some energy absorbing bumper systems attempt to reduce vehicle damage as a result of a low speed impact by managing impact energy and intrusion while not exceeding a rail load limit of the vehicle. In addition, some bumper systems attempt to reduce pedestrian injury as a result of an impact.

A bumper system typically includes a beam that extends widthwise across the front or rear of a vehicle and is mounted to rails that extend in a lengthwise direction. The beam typically is steel, and the steel beam is very stiff and provides structural strength and rigidity. To improve the energy absorbing efficiency of a bumper system, some bumper systems also include shock absorbers.

The efficiency of an energy absorbing bumper system, or assembly, is defined as the amount of energy absorbed over distance, or the amount of energy absorbed over load. A high efficiency bumper system absorbs more energy over a shorter distance than a low energy absorber. High efficiency is achieved by building load quickly to just under the rail load limit and maintaining that load constant until the impact energy has been dissipated.

To improve the energy absorbing efficiency, shock absorbers sometimes are positioned, for example, between the steel bumper beam and the vehicle rails. The shock absorbers are intended to absorb at least some of the energy resulting from an impact. Adding shock absorbers to a bumper assembly results in an added cost and complexity as compared to a steel beam. The shocks also add weight to the bumper assembly, which is also undesirable since such added weight may reduce the overall fuel efficiency of the vehicle.

Other known energy absorbing bumper systems include a W-shaped energy absorber. However, for beams with reduced heights, molding of W-shaped thermoplastic energy absorbers becomes infeasable.

BRIEF DESCRIPTION OF THE INVENTION

In one aspect, a bumper system for an automobile vehicle is provided. The bumper system includes a beam configured to attach to the vehicle, and an energy absorber coupled to the beam. The energy absorber is tunable for meeting predetermined criteria for both low speed and pedestrian impacts and includes a frame portion and a body including a plurality of tunable crush lobes extending from the frame portion. Each crush lobe is longitudinally spaced apart from an adjacent crush lobe, and at least one crush lobe includes a first transverse wall, a second transverse wall spaced apart from the first transverse wall, a third transverse wall spaced apart from the second transverse wall, and a front wall coupled to the first and second transverse walls. The first, second, and third transverse walls extend from the frame portion and the second transverse wall is located between the first and third transverse walls.

In another aspect, a bumper system for an automobile vehicle is provided that includes a beam configured to attach to the vehicle, a thermoplastic energy absorber coupled to the beam, the energy absorber being tunable for meeting predetermined criteria for both low speed and pedestrian impacts, and a fascia positioned and sized to envelop the beam and the energy absorber. The energy absorber includes a frame portion having a flange, and a body including a plurality of tunable crush lobes extending from the frame portion. Each crush lobe is longitudinally spaced apart from an adjacent crush lobe, and at least one crush lobe includes a first transverse wall, a second transverse wall spaced apart from the first transverse wall, a third transverse wall spaced apart from said second transverse wall, and a front wall coupled to the first and second transverse walls. The first, second, and third transverse walls extend from the frame portion, and the second transverse wall is located between the first and third transverse walls.

In another aspect, an energy absorber for a vehicle bumper system is provided. The energy absorber is tunable for meeting predetermined criteria for both low speed and pedestrian impacts and includes a frame portion and a body including a plurality of tunable crush lobes extending from the frame portion. Each crush lobe is longitudinally spaced apart from an adjacent crush lobe, and at least one crush lobe includes a first transverse wall, a second transverse wall spaced apart from the first transverse wall, a third transverse wall spaced apart from the second transverse wall, and a front wall coupled to the first and second transverse walls. The first, second, and third transverse walls extend from the frame portion and the second transverse wall is located between the first and third transverse walls.

DETAILED DESCRIPTION OF THE INVENTION

A bumper system that includes a tunable energy absorber is described below in detail. In an example embodiment, an energy absorber of the non-foam type is attached to a beam. The beam is fabricated, for example, from steel, aluminum, or glass mat thermoplastic (GMT). The energy absorber, in the example embodiment, is fabricated from Xenoy® thermoplastic material and is tunable so as to meet desired impact criteria, e.g., pedestrian and low speed impacts. More particularly, a front portion of the energy absorber is tuned, and tunable, to absorb pedestrian leg from impact, and a rear portion of the energy absorber is tuned, and tunable, for low speed barrier and pendulum impact. Impact forces during the specified types of impacts are maintained just below a predetermined level by deforming the energy absorber and beam until the kinetic energy of the impact event has been absorbed. When the impact is over, the energy absorber returns substantially to its original shape and retains sufficient integrity to withstand subsequent impacts.

Although the bumper system is described below with reference to specific materials (e.g. Xenoy® thermoplastic material (commercially available from General Electric Company, Pittsfield, Mass.) for the energy absorber), the system is not limited to practice with such materials and other materials can be used. For example, the beam need not necessarily be a steel, aluminum, or GMT compression molded beam, and other materials and fabrication techniques can be utilized. Generally, the energy absorber is selecting from materials that result in efficient energy absorption, and the beam materials and fabrication technique are selected to result in a stiff beam.

Figure 1:
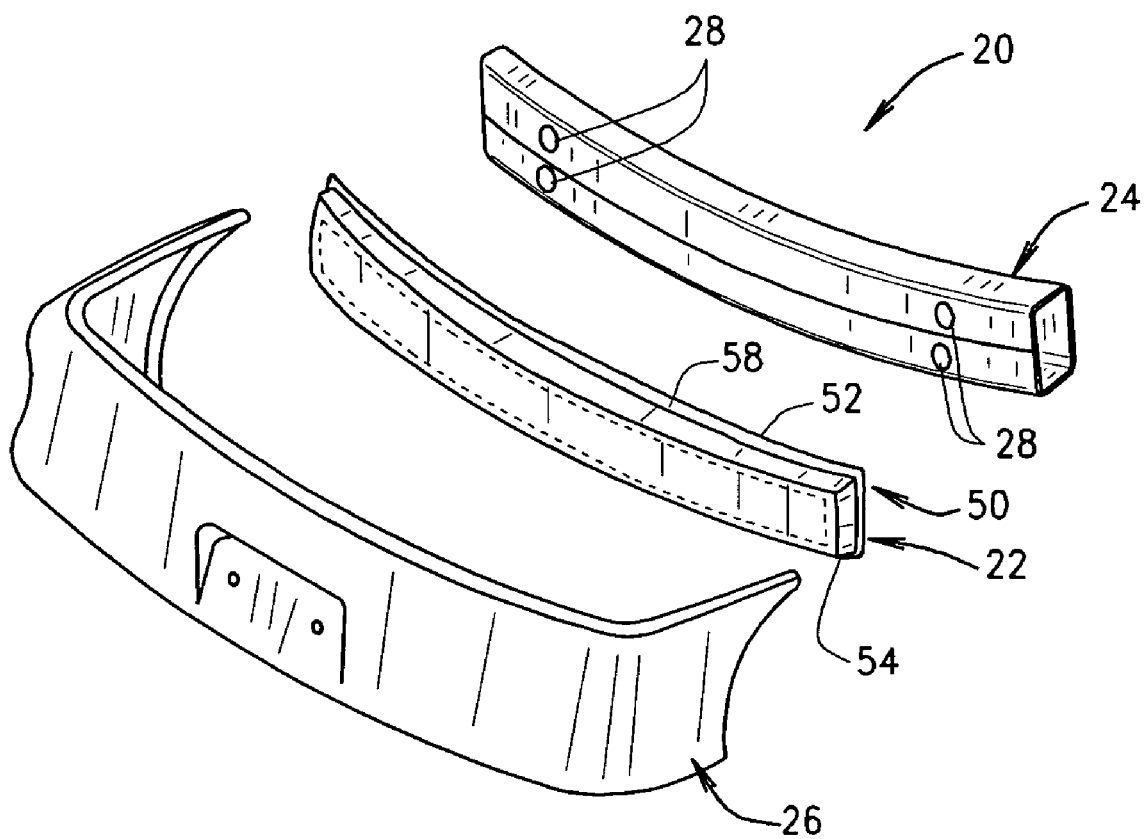
FIG. 1 is an exploded perspective schematic illustration of a bumper assembly in accordance with an embodiment of the present invention.

FIG. 1 is an exploded perspective view of one embodiment of a bumper system 20. System 20 includes an energy absorber 22 and a beam 24. Energy absorber 22 is positioned between beam 24 and a fascia 26 which, when assembled, form a vehicle bumper. As should be understood by those skilled in the art, beam 24 is attached to lengthwise extending frame rails (not shown).

Fascia 26 typically is generally formed from a thermoplastic material amenable to finishing utilizing conventional vehicle painting and/or coating techniques. Generally, fascia 26 envelops both energy absorber 22 and reinforcing beam 24 such that neither component is visible once attached to the vehicle.

Beam 24, in the example embodiment, is fabricated from extruded aluminum. In other embodiments, beam 24 is fabricated from roll formed steel or a compression molded glass mat thermoplastic (GMT). Beam 24 can have one of multiple geometries, including being configured as a B-section, a D-section, an I-beam, or having a C or W cross-sectional shape. The geometry of beam 24 is selected to provide a desired section modulus depending on the particular application in which the beam is to be used. Beam 24 includes rail attachment openings 28 so that bolts (not shown) can pass therethrough to secure bumper system 20 to the frame rails.

Energy absorber 22 includes a frame portion 50 having first and second longitudinally extending flanges 52 and 54, respectively, which overlap beam 24. Absorber 22 further includes a body 58 that extends outward from frame portion 50. The specific configuration of body 58 is illustrated and described below in connection with FIGS. 2 and 3.

Figure 2:
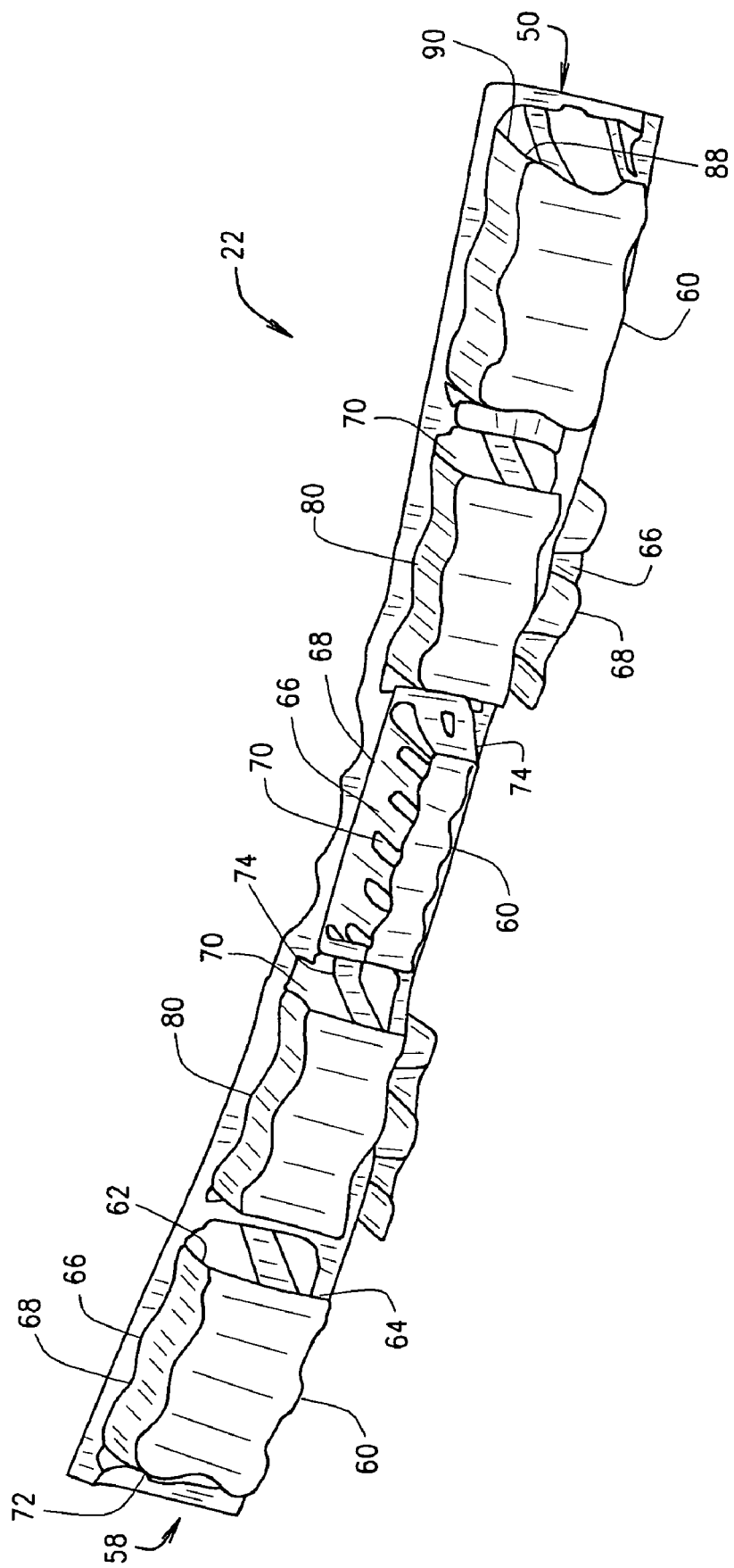
FIG. 2 is a perspective schematic illustration of the energy absorber shown in FIG. 1.
Figure 3:
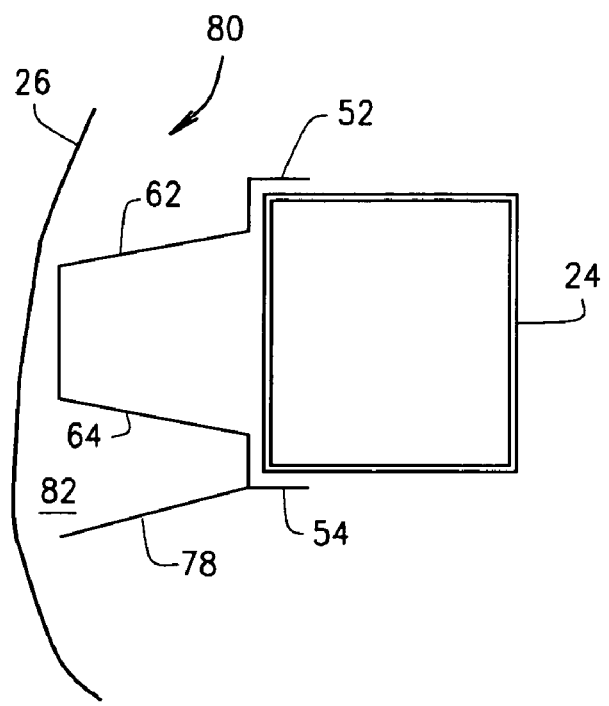
FIG. 3 is a sectional schematic illustration of the bumper assembly shown in FIG. 1.

Referring now to FIGS. 2, and 3, energy absorber body 58, includes a plurality of crush lobes 60 extending from frame 50 between flanges 52 and 54. Each crush lobe 60 is spaced apart from each other and includes a first transverse wall 62 and a second transverse wall 64. Transverse walls 62 and 64 are rippled and include alternating raised areas 66 and depressed areas 68 which provide the transverse walls with an added degree of stiffness to resist deflection upon impact. Transverse walls 62 and 64 can further include a plurality of windows or openings 70. The width and depth dimensions of the ripples, as well as the dimensions of openings 70, can be modified to achieve different stiffness characteristics as desired. Each crush lobe 60 also includes a first side wall 72 and a second side wall 74. An outer wall 76 extends between the distal ends of transverse walls 62 and 64, and side walls 72 and 74. At least one of the plurality of crush lobes 60 also includes a third transverse wall 78 to form a crush lobe 80. In one embodiment, crush lobe 80 has a substantially S-shaped cross-section. Third transverse wall 78 is located adjacent to and spaced apart from second transverse wall 64, but is not coupled to outer wall 76. Third transverse wall 78, similar to first and second transverse walls 62 and 64 is rippled and includes alternating raised areas 66 and depressed areas 68 which provide transverse wall 78 with an added degree of stiffness to resist deflection upon impact. Transverse wall 78 can also include a plurality of windows or openings 70. The width and depth dimensions of the ripples, as well as the shape and dimensions of openings 70, can be modified to achieve different stiffness characteristics as desired. For example, suitable shapes for openings 70 include, but are not limited to, a rectangular shape, a square shape, a triangular shape, or a teardrop shape.

Figure 4:
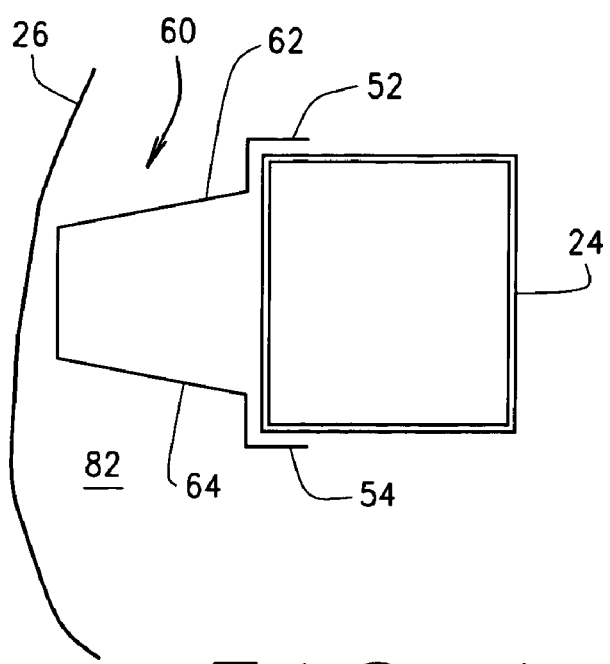
FIG. 4 is a sectional schematic illustration of a known bumper assembly.
Figure 5:
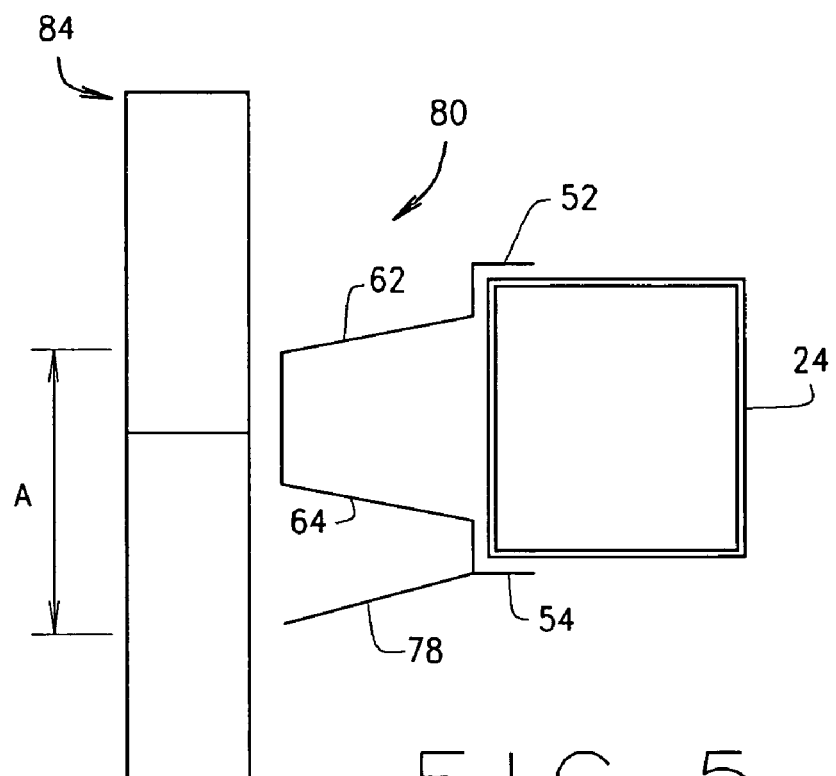
FIG. 5 is a schematic illustration of a positional relationship between the bumper assembly shown in FIG. 1 and a human leg.
Figure 6:
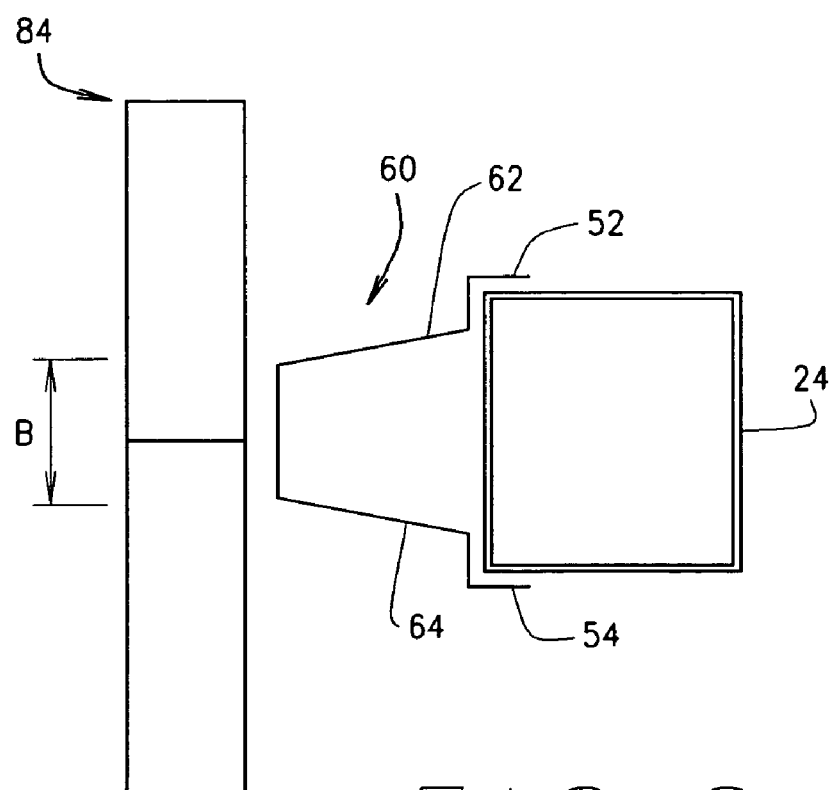
FIG. 6 is a schematic illustration of a positional relationship between the known bumper assembly shown in FIG. 4 and a human leg.

Third transverse wall 78 enlarges the energy absorbing area of crush lobe 80 as compared to crush lobe 60. As shown in FIG. 4, an area 82 located between fascia 26 and beam 24 has no support for a leg 84 (shown in FIG. 6) during an impact event. As shown in FIG. 3, third transverse wall 78 extends into area 82 and provides support for leg 84 (shown in FIG. 5) in an impact event. Further, as shown in FIG. 5, a length A of leg 84 that is supported by crush lobe 80 is greater than a length B of leg that is supported by crush lobe 60 shown in FIG. 6.

In further exemplary embodiments, side walls 72 and 74 and transverse walls 62, 64 and 78 vary linearly in thickness from a first front-most portion 88 to a rearmost portion 90. In one embodiment, the wall thickness varies from about 1 millimeter (mm) to about 7 mm, in another embodiment, from about 1.5 mm to about 5 mm, and still another embodiment, from about 2.5 mm to about 3.5 mm. In further embodiments, the thickness of the walls is constant from front-most portion 88 to rearmost portion 90 and is between about 1 mm to about 7 mm. In still further embodiments, the thickness of the walls are stepped. Particularly, the thickness of the walls of front-most portion 88 is constant and the thickness of the walls of rearmost portion 90 is constant with the walls of rearmost portion 90 thicker than the walls of front-most portion 88.

Crush lobes 60 and 80 are tunable in that by selecting a thickness of each portion 88 and 90, the response of crush lobes 60 and 80 can be altered. For example, front portion 88 of crush lobes 60 and 80 is tuned, and tunable, to absorb pedestrian leg form impact, and rear portion 90 is tuned, and tunable, for low speed and pendulum impact.

Each crush lobe 60 and 80 can, of course, have any one of a number of different geometries depending on the impact energy requirements for the vehicle. Each crush lobe 60 and 80 has an axial crush mode in both barrier and pendulum impacts according to Federal Motor Vehicle Safety Standard (FMVSS) and also has a stiffness tunability in order to meet the desired impact load deflection criteria.

Another aspect in appropriately tuning energy absorber 22 is the selection of the thermoplastic resin to be employed. The resin employed may be a low modulus, medium modulus or high modulus material as needed. By carefully considering each of these variables, energy absorbers meeting the desired energy impact objectives can be manufactured.

The characteristics of the material utilized to energy absorber 22 include high toughness/ductility, thermally stable, high energy absorption capacity, a good modulus-to-elongation ratio and recyclability. While the energy absorbers may be molded in segments, the absorbers also can be of unitary construction made from a tough plastic material. An example material for the absorbers is Xenoy material, as referenced above. Of course, other engineered thermoplastic resins can be used. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide (NORYL GTX® from General Electric Company), blends of polycarbonate/PET/PBT, polybutylene terephthalate and impact modifier (XENOY® resin from General Electric Company), polyamides, phenylene sulfide resins, polyvinyl chloride PVC, high impact polystyrene (HIPS), low/high density polyethylene, polypropylene and thermoplastic olefins (TPO).

The above described bumper assembly 20 permits better management of deceleration, rotation, and shear during lower leg impact. Bumper assembly 20 permits the use of smaller height beams while properly distributing the load during impact. Crush lobes 80 provide for increased leg coverage height and facilitates meeting or exceeding government pedestrian safety requirements.

While the invention has been described in terms of various specific embodiments, those skilled in the art will recognize that the invention can be practiced with modification within the spirit and scope of the claims.

What is claimed is:

1. A bumper system for an automobile vehicle, said bumper system comprising:
   a beam configured to attach to the vehicle; and
   an energy absorber coupled to said beam, said energy absorber being tunable for meeting predetermined criteria for both low speed and pedestrian impacts, said energy absorber comprising:
   a frame portion; and
   a body comprising a plurality of tunable crush lobes extending from said frame portion, each said crush lobe longitudinally spaced apart from an adjacent crush lobe, at least one crush lobe comprising:
   a first transverse wall extending substantially parallel to a longitudinal axis of said energy absorber;
   a second transverse wall spaced apart from said first transverse wall, said second transverse wall extending substantially parallel to a longitudinal axis of said energy absorber;
   a third transverse wall spaced apart from said second transverse wall, said third transverse wall extending substantially parallel to a longitudinal axis of said energy absorber, said first, second, and third transverse walls extending from said frame portion; and
   a front wall coupled to said first and said second transverse walls, said second transverse wall located between said first and said third transverse wall, at least one of said first, second, and third transverse walls is rippled.

2. A bumper system in accordance with claim 1 wherein at least one of said first, second, and third transverse walls comprise an opening of predetermined size and shape.

3. A bumper system in accordance with claim 1 wherein at least one of said plurality of crush lobes comprises a first side wall and a second side wall.

4. A bumper system in accordance with claim 3 wherein at least one of said first side wall and said second side wall comprises an opening of predetermined size and shape.

5. A bumper system in accordance with claim 4 wherein said energy absorber comprises an injection molded thermoplastic material.

6. A bumper system in accordance with claim 1 wherein said beam comprises at least one of steel, aluminum, thermoplastic, and glass mat thermoplastic.

7. A bumper system in accordance with claim 1 further comprising a fascia positioned and sized to envelop said beam and said energy absorber.

8. A bumper system for an automobile vehicle, said bumper system comprising:
   a beam configured to attach to the vehicle;
   a thermoplastic energy absorber coupled to said beam, said energy absorber being tunable for meeting predetermined criteria for both low speed and pedestrian impacts; and
   a fascia positioned and sized to envelop said beam and said energy absorber;
   said energy absorber comprising:
   a frame portion, said frame portion comprising a flange; and
   a body comprising a plurality of tunable crush lobes extending from said frame portion, each said crush lobe longitudinally spaced apart from an adjacent crush lobe, at least one crush lobe comprising:
   a first transverse wall extending substantially parallel to a longitudinal axis of said energy absorber;
   a second transverse wall spaced apart from said first transverse wall, said second transverse wall extending substantially parallel to a longitudinal axis of said energy absorber;
   a third transverse wall spaced apart from said second transverse wall, said third transverse wall extending substantially parallel to a longitudinal axis of said energy absorber, said first, second, and third transverse walls extending from said frame portion; and
   a front wall coupled to said first and said second transverse walls, said second transverse wall located between said first and said third transverse wall, at least one of said first. second, and third transverse walls is rippled.

9. A bumper system in accordance with claim 8 wherein at least one of said first, second, and third transverse walls comprise an opening of predetermined size and shape.

10. A bumper system in accordance with claim 8 wherein at least one of said plurality of crush lobes comprises a first side wall and a second side wall.

11. A bumper system in accordance with claim 10 wherein at least one of said first side wall and said second side wall comprises an opening of predetermined size and shape.

12. A bumper system in accordance with claim 11 wherein said energy absorber comprises an injection molded thermoplastic material.

13. A bumper system in accordance with claim 8 wherein said beam comprises at least one of steel, aluminum, thermoplastic, and glass mat thermoplastic.

14. An energy absorber for a vehicle bumper system, said energy absorber being tunable for meeting predetermined criteria for both low speed and pedestrian impacts and comprising:
   a frame portion; and
   a body comprising a plurality of tunable crush lobes extending from said frame portion, each said crush lobe longitudinally spaced apart from an adjacent crush lobe, at least one crush lobe comprising:
   a first transverse wall extending substantially parallel to a longitudinal axis of said energy absorber;
   a second transverse wall spaced apart from said first transverse wall, said second transverse wall extending substantially parallel to a longitudinal axis of said energy absorber;
   a third transverse wall spaced apart from said second transverse wall, said third transverse wall extending substantially parallel to a longitudinal axis of said energy absorber, said first, second, and third transverse walls extending from said frame portion; and a front wall coupled to said first and said second transverse walls, said second transverse wall located between said first and said third transverse wall, wherein at least one of said first, second, and third transverse walls is rippled.

15. An energy absorber in accordance with claim 14 wherein at least one of said first, second, and third transverse walls comprise an opening of predetermined size and shape.

16. A bumper system in accordance with claim 14 wherein at least one of said plurality of crush lobes comprises a first side wall and a second side wall.

17. A bumper system in accordance with claim 16 wherein at least one of said first side wall and said second side wall comprises an opening of predetermined size and shape.

* * * * *

UNITED STATES PATENT AND TRADEMARK OFFICE
CERTIFICATE OF CORRECTION

| | |
|---|---|
| PATENT NO. | : 7,278,667 B2 |
| APPLICATION NO. | : 11/135565 |
| DATED | : October 9, 2007 |
| INVENTOR(S) | : Mohapatra et al. |

It is certified that error appears in the above-identified patent and that said Letters Patent is hereby corrected as shown below:

In Claim 8, column 6, line 31, delete "first. second, and third" and insert therefor -- first, second, and third --.

Signed and Sealed this

First Day of July, 2008

JON W. DUDAS
*Director of the United States Patent and Trademark Office*